A. WINTON & H. B. ANDERSON.
AUTOMOBILE ENGINE HOOD.
APPLICATION FILED FEB. 1, 1909.
960,132.
Patented May 31, 1910.
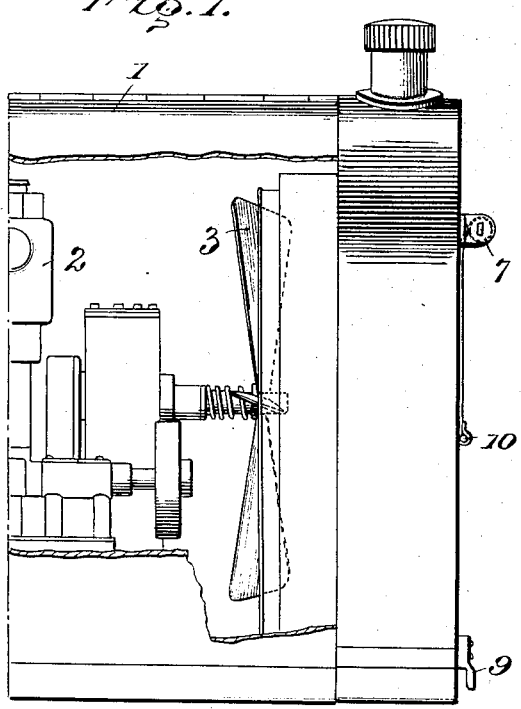
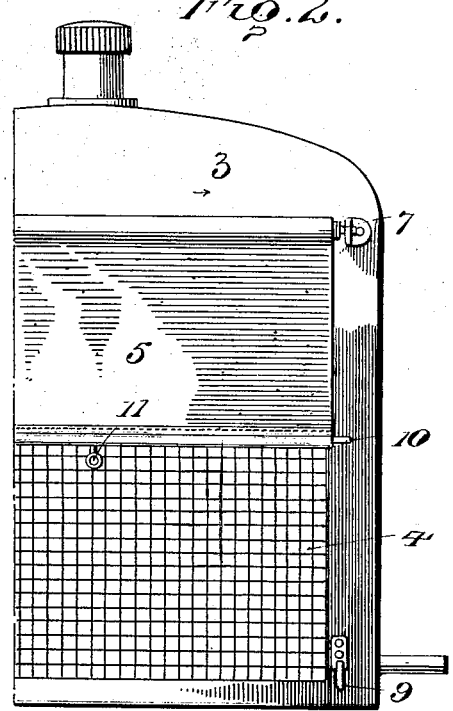
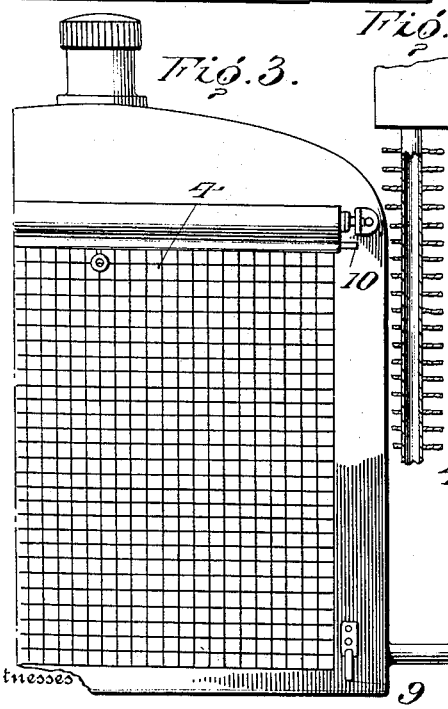
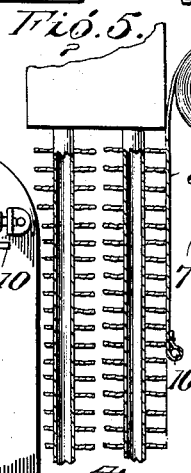
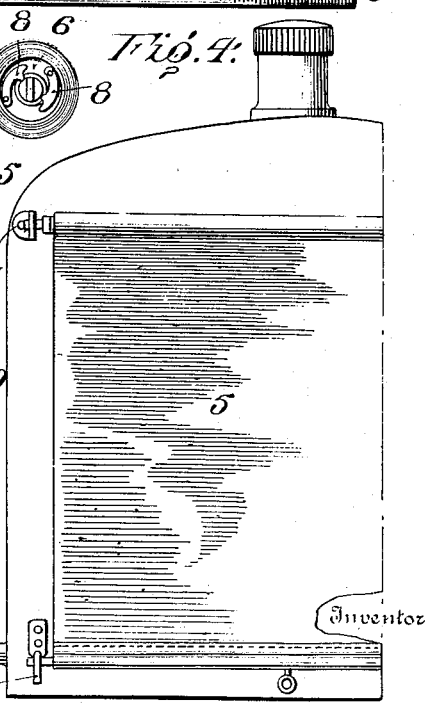
Witnesses
W. A. Williams
A. H. Ehrling
Inventors
Alexander Winton,
Harold B. Anderson,
By A. H. Pattison,
Attorney

UNITED STATES PATENT OFFICE.

ALEXANDER WINTON AND HAROLD B. ANDERSON, OF CLEVELAND, OHIO, ASSIGNORS TO THE WINTON MOTOR CARRIAGE COMPANY, OF CLEVELAND, OHIO.

AUTOMOBILE-ENGINE HOOD.

960,132.  Specification of Letters Patent.  Patented May 31, 1910.

Application filed February 1, 1909. Serial No. 475,422.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Automobile-Engine Hoods, of which the following is a specification, reference being had therein to the accompanying drawing.

This invention relates to improvements in automobile engine hoods, the object of which is to control circulation of air to the engine and water-cooling radiator for the purpose of preventing the excessive cooling of the engine and of the radiator, thus preventing the freezing of the water within the radiator, as well as facilitating the starting of the engine.

In the accompanying drawings, Figure 1, is a sectional view of the front end of an automobile engine hood, the radiator portion being shown in edge elevation, together with the present improvement. Fig. 2, is a front elevation of one-half of an automobile engine hood with the present improvement applied thereto, and in partial operation. Fig. 3, is a front elevation of a portion of an automobile engine hood with the present improvement applied thereto, and in an inoperative position. Fig. 4, is a front elevation of a portion of an automobile engine hood with the present improvement applied thereto, and in operative position. Fig. 5, is a sectional detail view of a portion of an automobile hood with the present improvement applied thereto.

This invention is for use in connection with the hoods which inclose explosive engines of automobiles. In automobiles of this type it is found that in very cold weather the engines are excessively cooled when running, and do not give the best result, and furthermore, in extremely cold weather this excessive cooling has sometimes been found so great that the water in the radiator freezes, thus causing the bursting of the radiator. Furthermore, in engines of this type, it is found that in the winter season, when left standing for a considerable period of time, the engines become excessively cold, which makes them difficult to start by reason of improper vaporization of the gasolene, and instant condensation thereof when it enters the cylinders of the engine, and also causes them to work unsatisfactorily until run a sufficient period of time to be warmed up. Furthermore, in automobiles with engines of the aforesaid type when left standing for a long period of time in cold weather, the engines become excessively cool and also the radiators, so that unless an antifreezing compound is used the engines and radiators become so cold that the water in the radiators will freeze, and the radiators are injured by bursting.

As is well known, the radiators of automobiles are composed of very thin metal, which makes them particularly sensitive to injury, and it is also well known that almost invariably the radiators of such automobiles are injured, for the reasons stated, if the water therein is permitted to freeze.

The present invention pertains to means for retaining within the hood the heat of the engine and of the water in the radiators, whether running or standing, thus permitting the automobile to be left for a considerable length of time without the engine becoming so excessively cold as to be difficult to start by reason thereof, or unsatisfactory in its operation, and without the freezing of the water in the radiators.

Referring now to the drawings, 1 indicates the engine hood, 2 a portion of the engine, 3 the circulating fan placed within the hood and between the engine and the radiator 4. It is also well known that the radiator practically fills or occupies the whole front end of the hood, and that the air is drawn through the radiator by the fan 3 into the hood, and by the fan forced against the engine and through the hood and out of the inner end thereof. In the modern automobile the bottom of the hood is closed, either by the engine base or by a suitable pan or other analogous device, neither of which are here shown, as they are so well understood that further illustration or description thereof would seem to be unnecessary.

In carrying out this improvement, means is provided for closing either a portion or the whole of the front end of the hood outside of the radiator, for the purpose of limiting the amount of air which passes through the radiator, and to the engine for the purpose of preventing excessive cooling thereof in extremely cold weather, as aforesaid, when the engine is running, or to wholly close the front end of the hood when the engine is standing, to prevent a circulation of air through the radiator and through the hood to the engine, thereby retaining within the hood the heat of the engine and of the radiator, which will permit the automobile to be left standing for a long time in cold weather without the excessive cooling of the engine, or of the freezing of the water in the radiator. This closing means may be of various forms, but the preferred form consists of a flexible sheet 5, and this flexible sheet 5 is preferably attached to a roll 6 which is supported at its ends by means of suitable brackets 7, and the flexible sheet 5 may be rolled upon this roll when not in use, or unrolled therefrom when in use. Preferably, this roll 6 is of the well known type of spring roll similar to that used in the ordinary window shade, which will permit the flexible sheet 5 to be partially unrolled therefrom and prevented from being rolled thereon by the spring through the medium of the well known catches 8 or similar devices. When the sheet is drawn down to entirely close the front end of the hood, as shown in Fig. 4, it is held in this position preferably by means of hooks 9 which are placed at the lower corners of the front end of the hood, and at the outer sides thereof. The lower end of the sheet 5 is provided with a rod 10 and the ends thereof project as shown, so that they may be placed under the hooks 9.

Owing to the flexible character of the sheet 5, which is preferably constructed of a suitable fabric, when the sheet is partially drawn over the front end of the hood as shown in Figs. 1 and 2, the air being sucked through the radiator and into the hood by the fan 3 will cause the flexible sheet to be drawn closely against the surface of the radiator. When the sheet is drawn all the way down as shown in Fig. 4, the front end of the hood and the radiator are entirely closed, which will retain the heat of the engine and radiator within the hood when the automobile is left standing, and will prevent access of cold air through the front end of the hood, and the radiator, to the engine or radiator, and thus prevent the excessive cooling of either the engine or the radiator for a long period of time, even in cold weather, thus avoiding the annoying difficulties in the starting of the engine; the unsatisfactory running thereof for a time after it is started, and the freezing of the water in the radiator, all of which annoyances exist with automobile hoods as now used. For the purpose of facilitating the operation of the sheet 5 for closing or opening the front end of the radiator, a suitable central pull or handle 11 is provided.

Having thus described this invention, what is claimed and desired to be secured by Letters Patent, is:—

The combination with an automobile engine of the explosive type of a hood inclosing the engine, a water radiator occupying the front end of the hood and having air passages communicating with the interior of the hood, a flexible sheet located at the front end of the hood and outside of the radiator and fitting against the front face of the radiator, a support for the sheet supported by the front end of the hood, said support being in the form of a roller upon which the sheet may be rolled and unrolled, and the sheet thereby caused to either close the front end of the hood or to be removed therefrom to leave it open, for the purpose described.

In testimony whereof we affix our signatures in presence of two witnesses.

ALEXANDER WINTON.
HAROLD B. ANDERSON.

Witnesses:
W. J. WARD,
A. S. NEWTON.